(12) United States Patent
Cheriton (10) Patent No.: US 7,245,623 B1
(45) Date of Patent: Jul. 17, 2007

(54) SYSTEM AND METHOD USING HIERARCHICAL PARALLEL BANKS OF ASSOCIATIVE MEMORIES

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1172 days.

(21) Appl. No.: 10/041,194

(22) Filed: Jan. 8, 2002

(51) Int. Cl.
*H04L 12/56* (2006.01)
*G06F 15/177* (2006.01)
*G06F 12/00* (2006.01)

(52) U.S. Cl. .................. 370/393; 709/220; 711/108
(58) Field of Classification Search ............... 370/393, 370/397, 395.71, 395.72, 392, 401, 412; 709/220–246; 711/108
See application file for complete search history.

(56) References Cited

U.S. PATENT DOCUMENTS

| | | | |
|---|---|---|---|
| 5,450,351 A | 9/1995 | Heddes | |
| 5,794,239 A | 8/1998 | Walster et al. | |
| 5,841,874 A * | 11/1998 | Kempke et al. | 713/160 |
| 6,055,364 A | 4/2000 | Speakman et al. | |
| 6,091,725 A | 7/2000 | Cheriton et al. | |
| 6,101,115 A | 8/2000 | Ross | |
| 6,137,707 A * | 10/2000 | Srinivasan et al. | 365/49 |
| 6,219,706 B1 | 4/2001 | Fan et al. | |
| 6,252,872 B1 * | 6/2001 | Tzeng | 370/360 |
| 6,343,072 B1 | 1/2002 | Bechtolsheim et al. | |
| 6,374,326 B1 * | 4/2002 | Kansal et al. | 711/108 |
| 6,389,507 B1 | 5/2002 | Sherman | |
| 6,487,666 B1 | 11/2002 | Shanklin et al. | |
| 6,591,331 B1 | 7/2003 | Khanna | |
| 6,609,205 B1 | 8/2003 | Bernhard et al. | |
| 6,633,548 B2 * | 10/2003 | Bachmutsky et al. | 370/255 |
| 6,651,096 B1 * | 11/2003 | Gai et al. | 709/223 |
| 6,665,725 B1 | 12/2003 | Dietz et al. | |
| 6,718,326 B2 * | 4/2004 | Uga et al. | 707/6 |
| 6,735,198 B1 | 5/2004 | Edsall et al. | |
| 6,741,591 B1 | 5/2004 | Kaldani et al. | |
| 6,785,677 B1 | 8/2004 | Fritchman | |
| 6,792,546 B1 | 9/2004 | Shanklin et al. | |

(Continued)

OTHER PUBLICATIONS

Tanenbaum, Andrew S., "Computer Networks" Third Edition; Chapter 1, Section 1.4.2, "The TCP/IP Reference Model"; Prentice Hall PTR, 1996, New Jersey, pp. 35-38.

(Continued)

*Primary Examiner*—Wing Chan
*Assistant Examiner*—Venkatesh Haliyur
(74) *Attorney, Agent, or Firm*—Cesari and McKenna LLP (57) ABSTRACT

A system and method provide for efficient classification of long strings of data, such as network messages. The system, which may be a classification engine for use in a network device, is configured to include one or more stages having one or more banks of ternary content addressable memories (TCAMs). The TCAM banks of each stage are organized into one or more groups and each group processes the network messages for a different set of the network device's ports. The system further includes at least one memory resource that is shared by the TCAM banks of all groups. That is, the parallel banks of TCAMs operate in a distributed fashion while the shared memory resource operates in a centralized fashion. Accordingly, the system can process network messages at high speed while minimizing the number of required components.

40 Claims, 5 Drawing Sheets

U.S. PATENT DOCUMENTS

| | | |
|---|---|---|
| 6,880,087 B1 | 4/2005 | Carter |
| 6,892,237 B1 | 5/2005 | Gai et al. |
| 6,988,189 B1* | 1/2006 | O'Connor et al. ........... 712/235 |
| 7,051,078 B1* | 5/2006 | Cheriton ...................... 709/214 |
| 2006/0155875 A1* | 7/2006 | Cheriton ...................... 709/245 |

OTHER PUBLICATIONS

Azgomi, S., Using Content-Addressable Memory for Networking Applications, Communication Systems Design, Nov. 1999, vol. 5, No. 11.

Gelinas, B., Alexander, P., Cheng, C., Hays, P., Virgile, K. and Dally, W., Lexra-NVP A Programmable OC-192c Powerplant, Jun. 14, 2001, pp. 1-16.

McAuley, Anthony J. and Francis, Paul, Fast Routing Table Lookup Using CAMs, Proc. IEEE INFOCOM, Mar. 28, 1993.

Srinivasan, V., A Packet Classification and Filter Management System, Proc. IEEE INFOCOM 2001, Apr. 26, 2001.

Special-purpose SRAMs smooth the ride, www.ednmag.com, Jun. 24, 1999, pp. 93-104.

Shubat, Alex and Balachandran, Krishna, CAMs Improve the Internet's performance, Integrated Communications Design, Dec. 2000, pp. 1-6.

Gallo, Anthony, Next Net needs smart memories, http://www.eetimes.com/story/oEG20001114S0031, (c) 1998, pp. 1-3.

Distributed Network-Based Application Recognition, Cisco Systems, Inc., Aug. 17, 2001, (c) 1992-2001, pp. 1-35.

Gupta, et al., Packet Classification on Multiple Fields, Proceedings of the Conference on Applications, Technologies, Architectures, and Protocols for Computer Communication, Association of Computing Machinery, (c)1999, pp. 147-160.

Sriinvasan, et al., Packet Classification on Using Tuple Space Search, Proceedings of the Conference on Applications, Technologies, Architectures, and Protocols for Computer Communication, Association of Computing Machinery, (c)1999, pp. 135-146.

Lakshman, et al., High-speed Policy-based Packet Forwarding Using Efficient Multi-dimensional Range Matching, Proceedings of the ACM SIGCOMM '98, Conference on Applications, Technologies, Architectures, and Protocols for Computer Communication, (c)1998, pp. 203-214.

Access control List: Overview and Guidelines, Cisco Systems, Inc., Dec. 21, 1997, pp. 1-7.

Network Node Registry-Access Control Lists, http://www.net.gov.bc.ca/NNR/NNR_AL_doc.html, Apr. 18, 1997, pp. 1-5.

Gupta, Pankaj, Fast Routing Lookup Mechanisms, Seminar on High-speed Switching Laboratory of Computer Science, MIT, Mar. 16, 1998, pp. 1-31.

* cited by examiner

SYSTEM AND METHOD USING HIERARCHICAL PARALLEL BANKS OF ASSOCIATIVE MEMORIES

CROSS-REFERENCE TO RELATED APPLICATIONS

This application is related to the following co-pending, commonly owned U.S. patent application:

U.S. patent application Ser. No. 09/613,039 entitled, HIERARCHICAL ASSOCIATIVE MEMORY-BASED CLASSIFICATION SYSTEM, filed Jul. 10, 2000.

BACKGROUND OF THE INVENTION

1. Field of the Invention

The present invention relates generally to computer networks, and more specifically, to a method and apparatus for configuring an associative memory device to efficiently perform matches against long input strings, such as network messages.

2. Background Information

A computer network typically comprises a plurality of interconnected entities that is transmit (i.e., "source") or receive (i.e., "sink") data frames. A common type of computer network is a local area network ("LAN") which typically refers to a privately owned network within a single building or campus. LANs employ a data communication protocol (LAN standard), such as Ethernet, FDDI or Token Ring, that defines the functions performed by the data link and physical layers of a communications architecture (i.e., a protocol stack), such as the Open Systems Interconnection (OSI) Reference Model. In many instances, multiple LANs may be interconnected by network links to form a wide area network ("WAN"), metropolitan area network ("MAN") or intranet. These LANs and/or WANs, moreover, may be coupled through one or more gateways to the well-known Internet.

Each network entity preferably includes network communication software, which may operate in accordance with the Transmission Control Protocol/Internet Protocol (TCP/IP) suite of communication protocols. TCP/IP basically consists of a set of rules defining how entities interact with each other. In particular, TCP/IP defines a series of communication layers, including a transport layer and a network layer. At the transport layer, TCP/IP includes both the User Datagram Protocol (UDP), which is a connectionless transport protocol, and TCP which is a reliable, connection-oriented transport protocol. When a process at one network entity wishes to communicate with another entity, it formulates one or more network messages and passes them to the upper layer of the TCP/IP communication stack. These messages are passed down through each layer of the stack where they are encapsulated into segments, packets and frames. Each layer also adds information in the form of a header to the messages. The frames are then transmitted over the network links as bits. At the destination entity, the bits are reassembled and passed up the layers of the destination entity's communication stack. At each layer, the corresponding message headers are stripped off, thereby recovering the original network message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving network messages at a source port and transferring them to at least one destination port for receipt by another entity. Switches may operate at various levels of the communication stack. For example, a switch may operate at layer 2, which, in the OSI Reference Model, is called the data link layer and includes both the Logical Link Control (LLC) and Media Access Control (MAC) sub-layers.

Other intermediate devices, commonly referred to as routers, may operate at higher communication layers, such as layer 3, which in TCP/IP networks corresponds to the Internet Protocol (IP) layer. IP message packets include a corresponding header which contains an IP source address and an IP destination address. Routers or layer 3 switches may re-assemble or convert received data frames from one LAN standard (e.g., Ethernet) to another (e.g. Token Ring). Thus, layer 3 devices are often used to interconnect dissimilar subnetworks. Some layer 3 devices may also examine the transport layer headers of received messages to identify the corresponding TCP or UDP port numbers being utilized by the corresponding network entities. Such extended-capability devices are often referred to as Layer 4, Layer 5, Layer 6 or Layer 7 switches or as Network Appliances.

Access Control Lists

Some networking software, including the Internetwork Operating System (IOS®) from Cisco Systems, Inc. of San Jose, Calif., supports the creation of access control lists or filters. These access control lists are typically used to prevent certain traffic from entering or exiting a network. In particular, a layer 3 device may utilize an access control list to decide whether a received message should be forwarded or filtered (i.e., dropped) based on certain predefined criteria. The criteria may be IP source address, IP destination address, or upper-layer application based on TCP/UDP port numbers. Many applications are assigned specific, fixed TCP and/or UDP port numbers in accordance with Request for Comments (RFC) 1700. For example, TCP/UDP port number 80 corresponds to the hyper text transport protocol (HTTP), while port number 21 corresponds to file transfer protocol (ftp) service. An access control list may thus allow e-mail to be forwarded, but cause all Telnet traffic to be dropped. Access control lists may be established for both inbound and outbound traffic and are most commonly configured at border devices (i.e., gateways or firewalls).

To generate an access control list, a network administrator typically defines a sequence of statements using a conventional text editor or graphical user interface (GUI). The statements typically recite some criteria of interest, e.g., IP addresses, port numbers, etc. As each subsequent statement is defined, it is appended to the end of the list. The completed list is then downloaded to the desired layer 3 device where it may be stored in the device's non-volatile RAM (NVRAM) typically as a linked list. Upon initialization, the device copies the access control list to its dynamic memory. When a packet is subsequently received at a given interface of the device, a software module of IOS® tests the received packet against each criteria statement in the list. That is, the statements are checked in the order presented by the list. Once a match is found, the corresponding decision or action (e.g., permit or deny) is returned and applied to the packet. In other words, following the first match, no more criteria statements are checked. Accordingly, at the end of each access control list a "deny all traffic" statement is often added. Thus, if a given packet does not match any of the criteria statements, the packet will be discarded.

Most intermediate network devices employ either centralized or distributed classification engines. With a centralized classification engine, both the processor executing the program instructions and the memory storing the actions are typically located on a single supervisor card disposed within the network device. All network messages received by the network device are sent to the supervisor card for processing by the classification engine. With a distributed architecture, the classification engine is replicated across a plurality of the device's line cards. For example, each line card, which has a plurality of ports, has its own classification engine for processing the network messages received and/or to be forwarded from those ports. The centralized architecture minimizes resources by requiring only a single store of the ACLs and the actions to be applied to the network messages. A centralized architecture, however, may produce a bottleneck reducing the device's performance as it must process the network messages from all of the device's ports. The distributed architecture generally improves performance because the classification process is spread across a plurality of engines. However, the distributed architectures require a replication of components across multiple line cards, thereby increasing the cost of the device.

As indicated above, access control lists are used primarily to provide security. Thus, for a given interface, only a single list is evaluated per direction. The lists, moreover, are relatively short. Nevertheless, the evaluation of such lists by software modules can significantly degrade the intermediate device's performance (e.g., number of packets processed per second). This degradation in performance has been accepted mainly due to a lack of acceptable alternatives. It is proposed, however, to expand the use of access control lists for additional features besides just security decisions. For example, access control lists may also be used to determine whether a given packet should be encrypted and/or whether a particular quality of service (QoS) treatment should be applied. Accordingly, it is anticipated that multiple access control lists may be assigned to a single interface. As additional access control lists are defined and evaluated per packet, the reduction in performance will likely reach unacceptable levels.

To improve performance, some devices store access control lists in an associative memory, such as a ternary content addressable memory (TCAM). Many TCAM suppliers currently make TCAMs up to 144 bits in width. This has proven acceptable because the total number of bits being evaluated is on the order of 133. In particular, the message fields currently being evaluated by access control lists (i.e., the criteria) include IP source address, IP destination address, protocol, TCP/UDP source port, TCP/UDP destination port, virtual local area network (VLAN) identifier, differentiated services codepoint (DSCP), and the physical port on which the message was received. With version 4 of the Internet Protocol (IPv4), source and destination addresses are 32 bits in length. Accordingly, the above information, typically referred to as the flow label, adds up to approximately 133 bits, which is less than the width of many commercially available TCAMs.

With version 6 of the Internet Protocol (IPv6), however, network layer addresses are now 128 bits long. Assuming the same fields are to be evaluated, the flow labels being evaluated are now approximately 336 bits long, which is more than twice the size of many current TCAMs. It is also proposed to evaluate higher-level messages, e.g., up to layer 7, which is the application layer. This would further increase the amount of information, and thus the number of bits, being evaluated.

In addition, TCAMs often require more power, are more expensive and are often slower than synchronous Random Access Memory (SRAM). Accordingly, as the speed of network links increases and intermediate devices are called upon to perform more and more processing of each packet, designers look to multiple SRAMs to perform packet classification operations. Multiple SRAM approaches, however, consume large amounts of printed circuit board space and increase the pin count, driving up the cost and complexity of the designs. In order to process IPv4 addresses, for example, a design might employ six SRAMs. For IPv6 addresses, twenty or more SRAMs might be required. Such a large number of SRAM components would likely result in unacceptably high power requirements. It may also increase the mean time between failures of the intermediate device, and place high thermal stresses on the device's mechanical design.

Accordingly, a need exists for a mechanism that can search long strings of data (e.g., 366 bits or more) at relatively high-speed and can do so in an efficient manner.

SUMMARY OF THE INVENTION

Briefly, the invention relates to a system and method utilized by a network device having a plurality of ports and/or interfaces for efficiently classifying long strings of data, such as network messages, by matching them. In the illustrative embodiment, the system is a classification engine that has been configured to include at least one stage having one or more parallel banks of ternary content addressable memories (TCAMs). The TCAM banks of one or more stages are organized into one or more groups and each group processes the network messages for a different set of the device's ports or interfaces. In other words, the TCAMs of the one or more stages are arranged in a distributed fashion as the TCAMs of each group may contain the same data or information. The classification engine further includes a single, high-speed memory resource that is shared by all of the TCAM banks. That is, the single memory resource operates in a centralized fashion. Accordingly, the system of the present invention combines the features of both distributed and centralized architectures into a single classification engine.

In the illustrative embodiment, a source component and a destination component from the network messages being processed are compared to the TCAM banks of a selected group of the first stage. Corresponding matches within the TCAM banks specify two respective records of a RAM associated with the TCAM banks; one for the source component and one for the destination component. These two records are then concatenated along with the other message fields to form a new search string which is applied to the TCAMs of a second stage. A match to a TCAM entry of the second stage provides an index to a record of the single, shared memory resource. This record preferably specifies the particular action (e.g., drop, forward, encrypt, etc.) that is to be applied to the network message.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
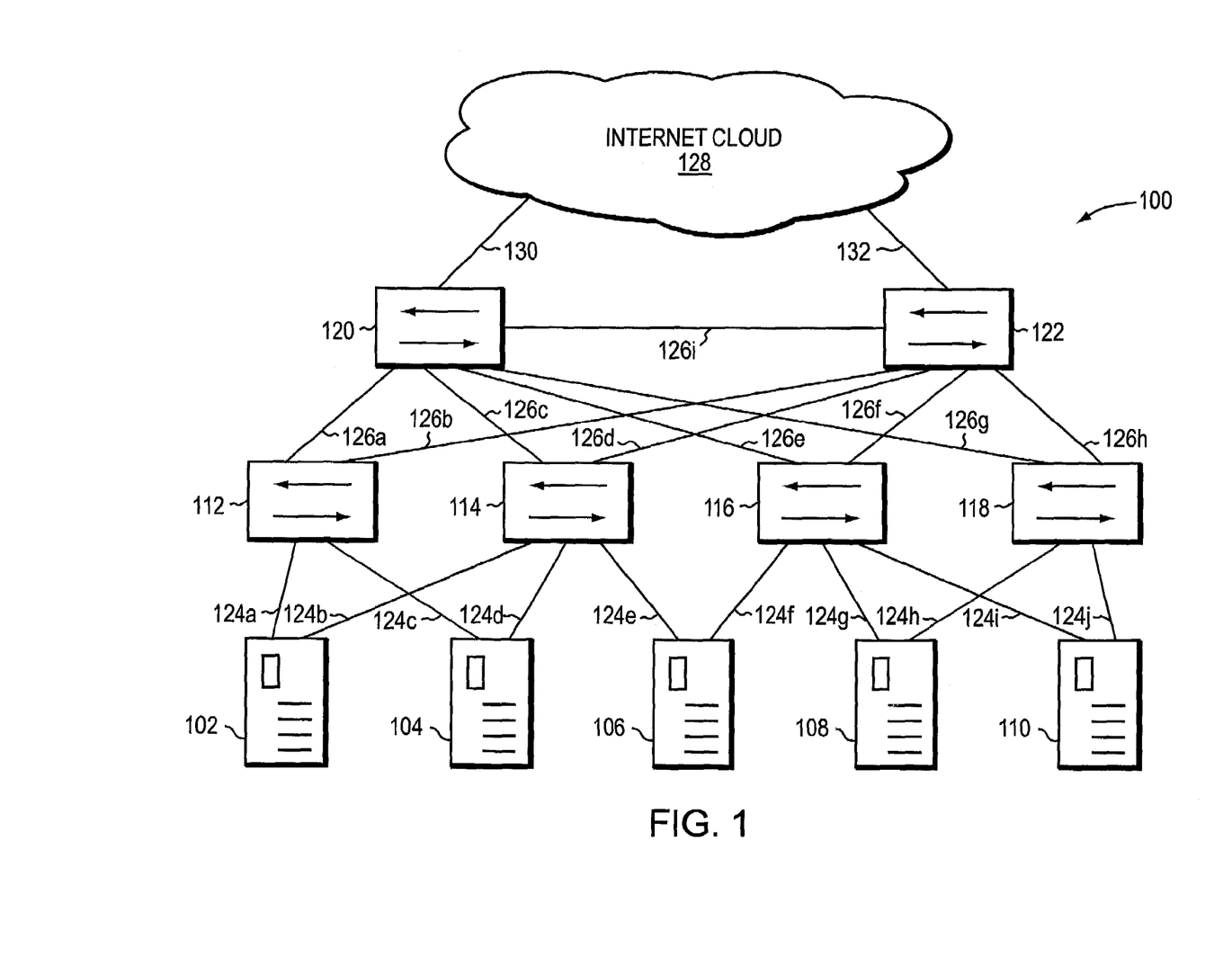
FIG. 1 is a highly schematic block diagram of a computer network.

FIG. 1 is a highly schematic illustration of a computer network 100. The network 100 includes a plurality of servers 102–110 and a plurality of intermediate network devices 112–122, such as backbone routers, high-speed switches, etc. Each server 102–110 is preferably coupled to two or more of the devices 112–122 by respective trunks or links 124a–j. Server 102, for example, is coupled to device 112 by link 124a, and to device 114 by link 124b. The devices 112–122 are similarly interconnected with each other by another set of trunks or links 126a–i. Significantly, the network 100 is also coupled to the well-known Internet, which is represented by Internet cloud 128. In particular, device 120 is coupled to the Internet 128 by link 130, and device 122 is coupled to the Internet 128 by link 132. Accordingly, network 100 allows users (not shown) who may be coupled to Internet cloud 128 through other networks or connections, to access any of the servers 102–110 and retrieve information posted on those servers 102–110.

It should be understood that the configuration of network 100 is meant for illustrative purposes only, and that the present invention will operate with other, possibly far more complex, network designs or topologies.

Figure 2:
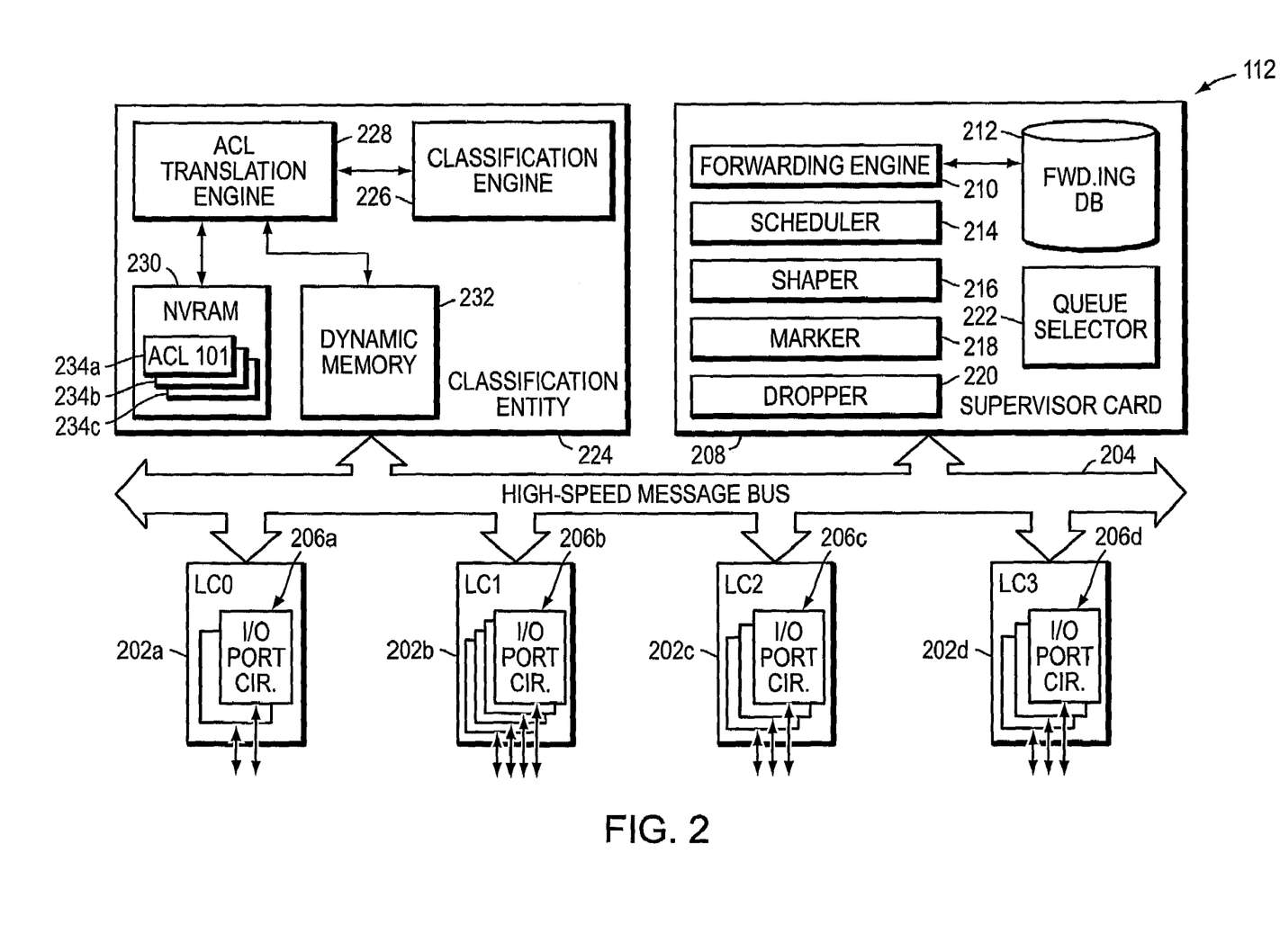
FIG. 2 is a partial, functional block diagram of an intermediate network device in accordance with the present invention.

FIG. 2 is a highly schematic, partial functional diagram of intermediate network device 112. Device 112 includes a plurality of line cards 202a–202d also identified as LC0–LC3 that are coupled to one or more high-speed switching components, such as bus 204. Each line card 202a–202d has a plurality of corresponding port input/output (I/O) circuits 206a–206d, respectively, that are each coupled to respective ports (not shown), thereby establishing interfaces and connecting device 112 to the entities of network 100 (FIG. 1). The port I/O circuits 206 cooperate with their respective line cards 202a–d to efficiently transmit data to, and receive data from, the switching bus 204. For example, communication among the various ports or cards may occur synchronously over the switching bus 204 using periodic bus cycles.

Also coupled to switching bus 204 are one or more supervisor cards, such as supervisor card 208, having a forwarding engine 210 coupled to a forwarding database (DB) 212. The forwarding engine 210 executes forwarding decisions for network messages placed onto the bus 204 and selects one or more destination ports (e.g., port I/O circuits 206) for forwarding those messages. The supervisor card may also include a plurality of conventional sub-components configured to implement quality of service (QoS) services or treatments, such as a scheduler 214, a shaper 216, a marker 218, a dropper 220, and a queue selector 222.

Each line card 202a–202d also includes its own message buffer (not shown) for temporarily storing messages traversing the bus 204. In addition, a respective buffer circuit (not shown) may be used to connect each line card 202a–d to the switching bus 204. This buffer circuit may be located on the switching bus 204 and provide a single clock (i.e., 40 nanoseconds) delay between the bus 204 and each port on the respective card 202. Such clock cycle delay maintains proper bus loading so that data transmitted from the ports can be properly driven onto the bus 204.

In a preferred embodiment, the bus 204 is realized in a single data path chip that is specially designed to support high data transfer rates, e.g., on the order of 320 gigabits per second or 480 million packets per second. All of the device's ports as well as the supervisor card 208 are coupled to this data path chip which would output message header information to the forwarding engine 210 for a decision.

In accordance with the present invention, device 112 further includes a high-speed classification entity 224 that is similarly coupled to the bus 204. Entity 224 may be a separate card or printed circuit board and/or it may be part of the supervisor card 208. The classification entity 224 includes a classification engine 226 and an Access Control List (ACL) translation engine 228. As described herein, the classification engine 226 examines network messages, e.g., packets or frames, that are received on and/or to be forwarded from the ports 206 of device 112 and generates actions or decisions for those messages. The classification entity 224 may further include or have access to a nonvolatile random access memory (NVRAM) 230 and a dynamic memory 232. The NVRAM 230 may contain one or more text-based access control lists (ACLs) 234a–c. Dynamic memory 232 may contain a plurality of applications or other programs, such as an encryption function and a logging function, that may be executed by one or more processing elements (not shown), such as a microprocessor, a central processing unit (CPU), an Application Specific Integrated Circuit (ASIC), etc., that are disposed at device 112.

ACL translation engine 228 is operatively coupled to NVRAM 230 for accessing the text-based ACLs 234a–c, to the dynamic memory 232 for processing the ACLs 234, and to the classification engine 226 for storing modified versions of the ACLs 234 therein, as described below. ACL translation engine 228 preferably comprises computer readable media containing executable software programs, such as software modules or libraries.

It should be understood that the ACL translation engine 228 may be stored at dynamic memory 232 and run on or otherwise be executed by one of the processing elements. Engine 228 may also be implemented in hardware through a plurality of registers and combinational logic configured to produce sequential logic circuits and cooperating state machines. Those skilled in the art will recognize that other combinations of software and hardware implementations may be utilized.

The classification engine 226, moreover, may be configured to perform input classification and/or output classification. Input classification refers to the process of classifying a network message based on the port or interface on which it was received as well as on information from the network message itself. With output classification, a classification decision is made based upon the port or ports on from which a given network message is to be sent as well as on information from the network message itself.

A suitable platform for intermediate network device 112 are the Catalyst 4000 switches, the Catalyst 8500® series of switch routers, and/or the Catalyst® 6000 family of multilayer switches all from Cisco Systems, Inc. of San Jose, Calif. Nonetheless, those skilled in the art will recognize that the present invention will work with other intermediate network devices.

Figure 3:
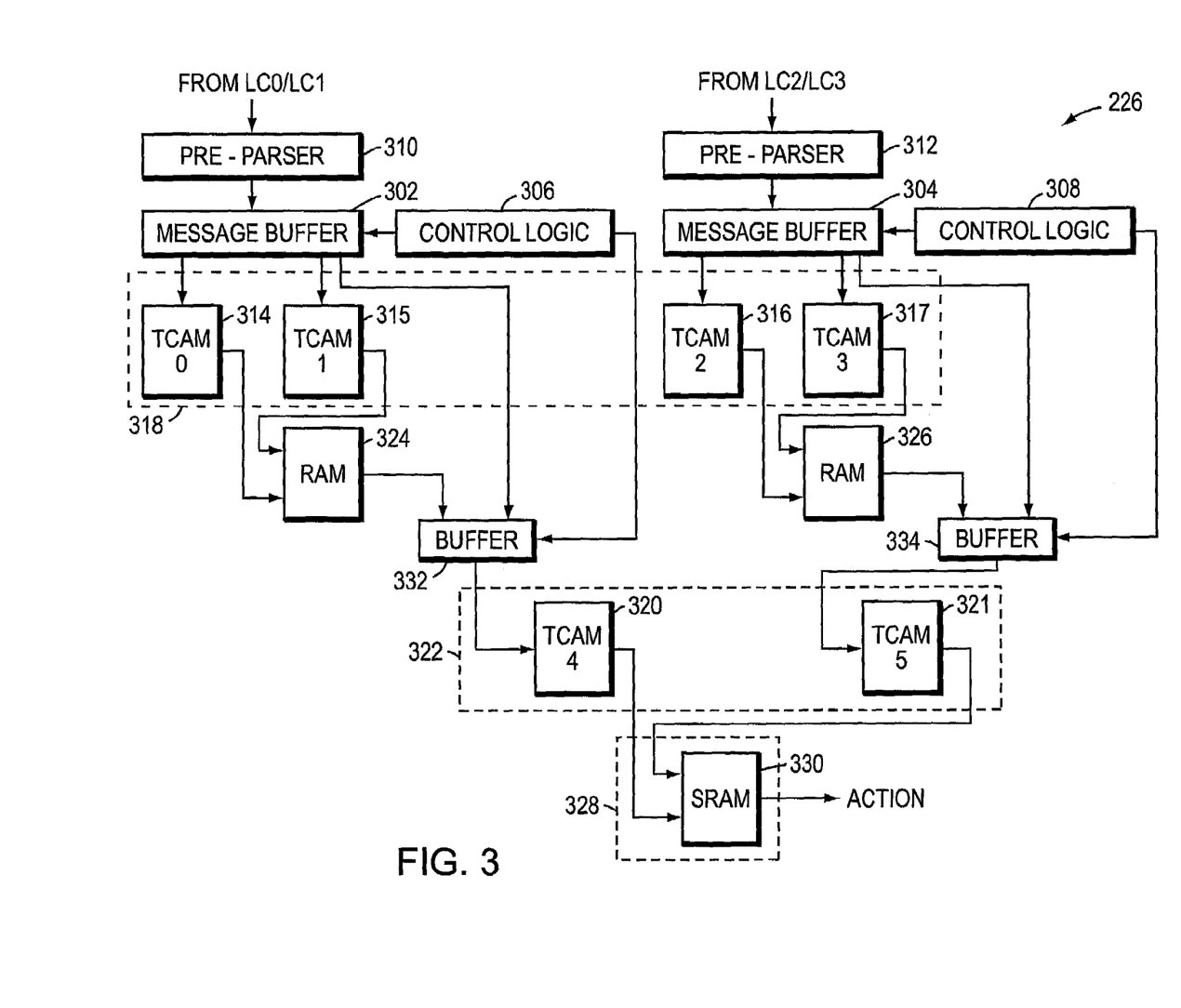
FIG. 3 is a highly schematic block diagram of the classification engine of the device of FIG. 2.

FIG. 3 is a highly schematic block diagram of a preferred embodiment of the classification engine 226 of the present invention. Classification engine 226 may include one or more message buffers, such as buffers 302, 304, to which one or more control logic circuits, 306, 308 are operatively coupled. Engine 226 may further include one or more pre-parser logic circuits 310, 312 that are also coupled to the message buffers 302, 304 for extracting selected information from network messages and storing it in the buffers. Engine 226 includes a plurality of associative memories arranged into one or more stages. The term "associative memory" is intended to include any associative memory device, including ternary content addressable memories (TCAMs), binary content addressable memories (CAMs), hash tables, etc. Within each stage, moreover, the associative memories are organized into one or more parallel banks. A parallel bank, as explained herein, refers to a plurality of associative memories configured, e.g., programmed, so that they can search the same field(s) or string of multiple network messages at substantially the same time. The individual associative memories of a given parallel bank may or may not contain the same search criteria. That is, they may or may not constitute replications of each other.

In the illustrative embodiment, engine 226 has four TCAMs 314–317 that are organized into a first stage 318, and two TCAMs 320–321 that are organized into a second stage 322. Each TCAM 314–317 of the first stage 318 is coupled to and thus associated with a corresponding memory structure, such as a random access memories (RAMs) 324 and 326. As shown, TCAMs 314 and 315 share RAM 324 and TCAMs 316 and 317 share RAM 326. The classification engine 226 also includes a single, shared memory resource 328. In the preferred embodiment, resource 328 is a synchronous RAM (SRAM) 330. Each TCAM 320 and 321 of the second stage 322 is coupled to and thus associated with the memory resource 328, e.g., with SRAM 330. That is, the single SRAM 328 is utilized by both TCAM 320 and TCAM 321. Engine 226 further includes a plurality of intermediate buffers 332, 334 that are configured to store information from the RAMs 324, 326 as well as from the messages buffers 302, 304. Intermediate buffers 332, 334 may also be under the control of the control logic circuits 306, 308.

Each TCAM 312–315 and 320–321 has a plurality of entries and each entry is made up of a plurality of cells. The cells of the TCAMs 312–315 and 320–321, moreover, are associated with or assigned one of three possible values (e.g., "0", "1" or "don't care") and is programmed with searchable data or information, e.g., preselected criteria. Each TCAM entry also specifies a corresponding entry of the memory structure that is associated with the TCAM. In particular, each entry of TCAMs 314 and 315 specifies a entry of RAM 324, while each entry of TCAMs 316 and 317 specifies an entry of RAM 326. Similarly, each entry of TCAMs 320 and 321 specifies an entry of SRAM 328. In other words, each TCAM entry may further include an address into the associated RAM identifying a record therein at which data or information is stored.

As explained herein, TCAM0 314 and TCAM2 316 form a first parallel bank for searching a given field(s) or string of multiple, e.g., two, network messages, such as the messages' IPv6 source addresses (SAs), at substantially the same time. TCAM1 315 and TCAM3 317 form a second parallel bank for searching another field(s) or string of multiple network messages, such as the messages' IPv6 destination address (DAs), at substantially the same time. TCAM4 320 and TCAM5 321 form a third parallel bank. In the preferred embodiment, the TCAMs of the third parallel bank can search a modified flow label of multiple network messages at substantially the same time. The phrase "substantially the same time" means during the same clock cycle of the respective associative memories.

In the illustrative embodiment, the parallel banks of TCAMs 314–317 and 320–321 are also organized into groups such that each group processes network messages for a distinct set of line cards, ports and/or interfaces. In the illustrative embodiment, TCAMs 314, 315 and 320 also referred to as TCAM0, TCAM1 and TCAM4 form a first group for processing messages for line cards LC0 and LC1. TCAMs 316, 317 and 321 also referred to as TCAM2, TCAM3 and TCAM5 form a second group for processing network messages for line cards LC2 and LC3. As TCAMs 314–317 and 320–321 can all be operating simultaneously, engine 326 can be processing multiple network messages at any given time. SRAM 328, moreover, is selected to have an operating or processing speed that is preferably twice the operating or processing speed of TCAMs 320 and 321. Thus, only a single SRAM 328 is required to process the outputs of both TCAM 320 and TCAM 321.

Programming the Classification Engine

The classification engine 326 is programmed by the ACL translation engine 228 is to include the criteria and actions of ACLs 234a–c. As indicated above, each ACL 234a–c comprises a plurality of Access Control Entry (ACE) statements, which specify the various criteria for the respective ACL. These criteria may include IP source address, IP destination address, TCP/UDP source port, TCP/UDP destination port, transport protocol, VLAN ID, DSCP, physical port, etc. Each ACE also specifies a particular action that is to be applied to network messages matching a corresponding ACE statement. Exemplary actions include permit, deny, permit and log, and deny and log, although other actions may be specified. For example, a possible action may be to execute a particular program stored in the non-volatile or dynamic memories of the respective device or to apply a particular Quality of Service (QoS) treatment or service.

In the illustrative embodiment, the TCAMs 314–317 and 320–321 and RAMs 324, 326 and shared memory resource 328 of engine 326 are programmed in the manner described in application Ser. No. 09/613,039 entitled, HIERARCHICAL ASSOCIATIVE MEMORY-BASED CLASSIFICATION SYSTEM, filed Jul. 10, 2000 by the same inventor herein, which is hereby incorporated by reference in its entirety as though fully set forth herein. More specifically, the TCAMs 314–317 making up the first stage 318 are preferably programmed with at least the IPv6 source and destination addresses as they are typically the longest fields being searched, i.e., 128 bits long. In particular, TCAMs 314 and 316, which form a first parallel bank, are each programmed with IPv6 source addresses, and TCAMs 315 and 317, which form a second parallel bank, are each programmed with IPv6 destination addresses.

As recited in the '039 patent application, one of the first steps in programming engine 226 is to examine all of the IP source addresses of the current ACL and to identify "coordinate subfields". A coordinate subfield is basically a range of bit positions such that, for all of the IP source addresses, and/or destination addresses as the case may be, within the ACL, each IP address has either a specific value for the entire bit range or has all don't care values for the entire bit range. Next, the ACL translation engine 228 determines the number of distinct values, K, that each coordinate sub-field may have. ACL translation engine 228 then computes the minimum number of bits needed to represent each distinct value, K, for each coordinate subfield. For each sub-field, a "unique coordinate value" (UCV) is then assigned to each distinct and other value K within that sub-field, and the UCVs are concatenated to form a plurality of "unique coordinate value sequences" (UCVSs). The TCAMs 314–317 of the first stage 318 are then loaded with IPv6 source and destination addresses, while RAMs 324 and 326 are loaded with the corresponding UCVSs.

The TCAMs 320–321 of the second stage 322, which form a third parallel bank, are then loaded with the criteria fields of the ACL's ACEs, but with the source and destination IPv6 address fields replaced with their corresponding UCV-concatenated (i.e., UCVS) versions. For each UCV sub-field of the UCVS that corresponds to "other" values, the TCAM mask is set to don't care. The corresponding ACL actions are loaded into the single shared memory resource 328.

This programming procedure results in the contents of TCAM 314 being the same as the contents of TCAM 316. Similarly, the contents of TCAM 315 will be the same as the contents of TCAM 317. The contents of RAMs 324 and 326, and the contents of TCAMs 320 and 321 are also the same. Those skilled in the art will recognize that if the ACLs assigned to the line cards 202a–b differ from the ACLs assigned to line cards 202c–d, then the contents of the TCAMs may not be copies of each other.

It should be understood that, depending on their width, TCAMs 314–317 may be programmed with more than IPv6 source and destination addresses. They may, for example, also be programmed with TCP/UDP source and destination ports.

Operation of the Classification Engine

In operation, suppose that the forwarding engine 210 has determined that a first network message is to be sent from selected I/O port circuitry 206 at LC0 202a, and that a second network message is to be sent from LC3 202d. Suppose further that the classification engine 226 is being utilized to perform output classification on these two messages. In this case, both messages or portions thereof are sent to the classification entity 224 via high-speed bus 204, and the messages are handed to the classification engine 226 for processing. In particular, the first message is provided to pre-parser logic 310 as it is going to be sent from LC0 202a, and the second message is provided to pre-parser logic 312 as it is going to be sent from LC3 202d.

The pre-parser logic circuits 310, 312 are configured to extract one or more fields from the first and second messages, and to store these selected fields in the respective message buffers 302, 304. For example, pre-parser logic circuits 310, 312 may be configured to generate a desired flow label by extracting the destination and source ports, IP SA, IP DA and protocol fields, as well as the VLAN ID, DSCP and physical port on which the respective message was received and/or is to be sent, among other information. This data or information is preferably passed to and temporarily stored by the respective message buffers 302, 304. Under the control of buffer control logic 306, 308, one or more of these fields are applied to the parallel banks of TCAMs 314–317 of the first stage 318, while the remaining fields are placed in the intermediate buffers 332, 334.

Figure 4:
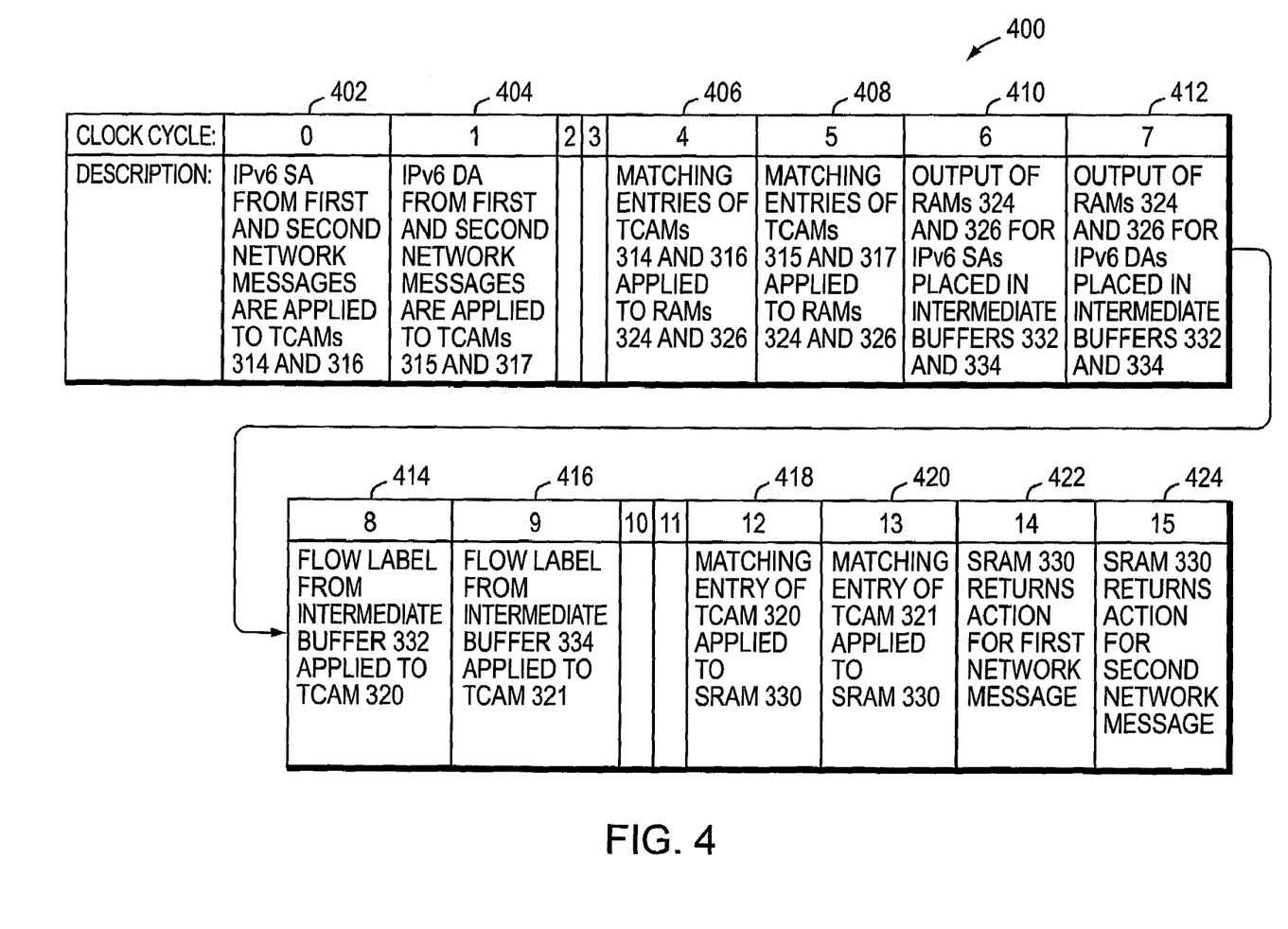
FIG. 4 is a highly schematic timing diagram illustrating the operation of the classification engine of FIG. 3.

FIG. 4 is a highly schematic timing diagram 400 illustrating the operation of classification engine 226 in terms of the clock cycles of the TCAMs 314–317 and 320–321. In the illustrative embodiment, the IPv6 SA from the first message is applied to TCAM0 314 and the IPv6 SA from the second message is applied to TCAM2 316 during the same clock cycle, e.g., clock cycle 0 (402). At the next clock cycle, clock cycle 1 (404), the IPv6 DA from the first message is applied to TCAM1 315 and the IPv6 DA from the second message is applied to TCAM3 317. In a conventional manner, all entries of TCAMs 314–317 are searched simultaneously for the IPv6 SAs and DAs of the first and second messages. Assuming TCAMs 314–317 have a four cycle access time, i.e., they produce a result in four clock cycles, the entry of TCAM0 314 that matches the SA of the first message, and the entry of TCAM2 316 that matches the SA of the second message are returned and applied to RAMs 324 and 326 during clock cycle 4 (406). The matching entry of TCAM0 314 specifies a particular entry of RAM 324 which, as described above, contains the UCVS corresponding to the first message's SA. Similarly, the matching entry of TCAM2 316 specifies a particular entry of RAM 326 which contains the UCVS corresponding to the second message's SA. The entries of TCAMs 315 and 317 which match the DAs of the first and second message are returned and applied to RAMs 324 and 326 during clock cycle 5 (408).

Assuming RAMs 324 and 326 operate at twice the speed of TCAMs 314–317, i.e., their access times are one-half that of the TCAMs, the UCVSs for the SAs of the first and second messages are returned and placed in intermediate buffers 332 and 334 during clock cycle 6 (410). In a similar manner, the UCVSs for the DAs of the first and second messages are returned and placed in intermediate buffers 332 and 334 during clock cycle 7 (412). It should be understood that control logic 306 and 308 preferably move the other fields of the first and second messages into the intermediate buffers 332 and 334 during any of clock cycles 0–7. Thus, by clock cycle 7 (412), intermediate buffers 332 and 334 hold the modified flow labels for the first and second messages. The flow labels are modified as the IPv6 addresses of the two messages have been replaced with shorter UCVSs.

At clock cycle 8 (414), the modified flow label for the first message is applied to TCAM4 320. That is, all entries of TCAM4 320 are compared to the flow label. At clock cycle 9 (416), the modified flow label for the second message is applied to TCAM5 321. Again, TCAMs 320 and 321 produce a result in four clock cycles. The matching entry of TCAM4 320, which specifies an entry in the SRAM 330, is returned and applied to SRAM 330 during clock cycle 12 (418). Similarly, the matching entry of TCAM5 321, which also specifies an entry in the SRAM 330, is returned and applied to SRAM 330 during clock cycle 13 (420). As indicated above, the SRAM 300 stores the actions for network messages. Assuming SRAM 330 also operates at twice the speed of the TCAMs, SRAM 330 returns the action, e.g., mark, for the first message during clock cycle 14 (422) and the action, e.g., drop, for the second message during clock cycle 15 (424). The identified actions may then be passed to the supervisor card 208 for execution. That is, in response to the specified actions received from the classification entity 224, the supervisor card 208 marks the first message and drops the second message.

As shown, the classification engine 226 of the present invention improves overall packet processing speeds while keeping the number of components low and their size to a minimum. For example, TCAMs having a much smaller width than the full flow label being searched can be used at TCAMs 320 and 321 since the larger fields have been replaced with their UCVSs. Accordingly, less printed circuit board space is consumed with the present design.

Those skilled in the art will understand that the IPv6 addresses of the first message may be applied to TCAMs 314 and 315 either simultaneously, i.e., during the same clock cycle of TCAMs 315 and 315, or staggered by one or more of the TCAMs' clock cycles. Because RAM 324 operates twice as fast as TCAMs 314 and 315, it is able to produce the corresponding outputs for both TCAM 314 and TCAM 315 during a single clock cycle of those TCAMs. Thus, RAM 324 can keep up with these components whether they are producing outputs, i.e., RAM addresses, simultaneously or sequentially. This is also true for TCAMs 316 and 317 and RAM 326. Similarly, the flow labels from intermediate buffers 332 and 334 may be applied to TCAMs 320 and 321 either simultaneously or staggered by one or more clock cycles of TCAMs 320 and 321.

In the preferred embodiment, the TCAMs 314–317 of the first stage 318 are preferably 144 bits wide and 32K entries deep and have an operating speed in the range of 167 to 250 MHz. Each TCAM 314–317 performs a lookup once every two clock cycles or 83 to 125 million lookups per second. RAMs 324, 326 preferably have an operating speed that is twice the operating speed of TCAMs 314–317. That is, RAMs 324, 326 each perform a lookup every clock cycle. The TCAMs 320–321 of the second stage 322 are also preferably 144 bits wide and 32K entries deep and also have an operating speed in the range of 167 to 250 MHz. SRAM 330 also has an operating speed that is twice the operating speed of TCAMs 320–321. If less information is being processed, e.g., IPv4 packets, TCAMs having a width of 72 bits and a 64K entries could be utilized.

Suitable TCAMs for use with the present invention are commercially available from a number of manufacturers, including Integrated Device Technology, Inc. (IDT) of Santa Clara, Calif., Cypress Semiconductor Corp. of San Jose, Calif., International Business Machines Corp. (IBM) of Armonk, N.Y., NetLogic Microsystems, Inc. of Mountain View, Calif., and from Music Semiconductors of Hackettstown, N.J., among others. Suitable RAMs and SRAMs for use with the present invention are also commercially available from a number of manufacturers, including IDT, Cypress Semiconductors, IBM and Infineon Technologies AG of Munich Germany, among others. RAMs 324, 326 and SRAM 330 may be single or multiple, e.g., dual, port devices.

It should be understood that classification engine 226 may have more than two stages of parallel banks of TCAMs, depending on the number of messages fields or data strings to be searched and/or the size of those fields or strings. Furthermore, additional stages having TCAMs of narrower widths may also be used. Those skilled in the art, moreover, will recognize that any one or more of TCAMs 314–317 and 320–321 may be replaced with a corresponding binary CAM.

It should also be understood that a single RAM having an operating speed that is four times the operating speed of TCAMs 314–317 may be used in place of the two RAMs 324 and 326.

It should be further understood that the classification engine 226 of the present invention may be implemented in one or more programmable logic devices (PLDs) and/or application specific integrated circuits (ASICs) with RAMs 324, 326 and SRAM 328 either built-in or separate from the PLD(s). In addition, RAMs 324, 326 may be Dynamic RAMs (DRAMs), Synchronous RAMs (SRAMs), double data rate RAMs (DDRAMs) and/or Rambus RAMs (RRAMs), among other RAM technologies.

It should be further understood that the programming of TCAMs 314–317 and 320–321, including the translation of IPv6 addresses to their UCVSs, as described above, may be performed remotely from device 112. For example, these functions may be performed at a management and/or network administrator station and the results remotely programmed into the classification engine 226. In this case, there would be no need for the classification entity 224 to include an ACL translation engine 228.

Figure 5:
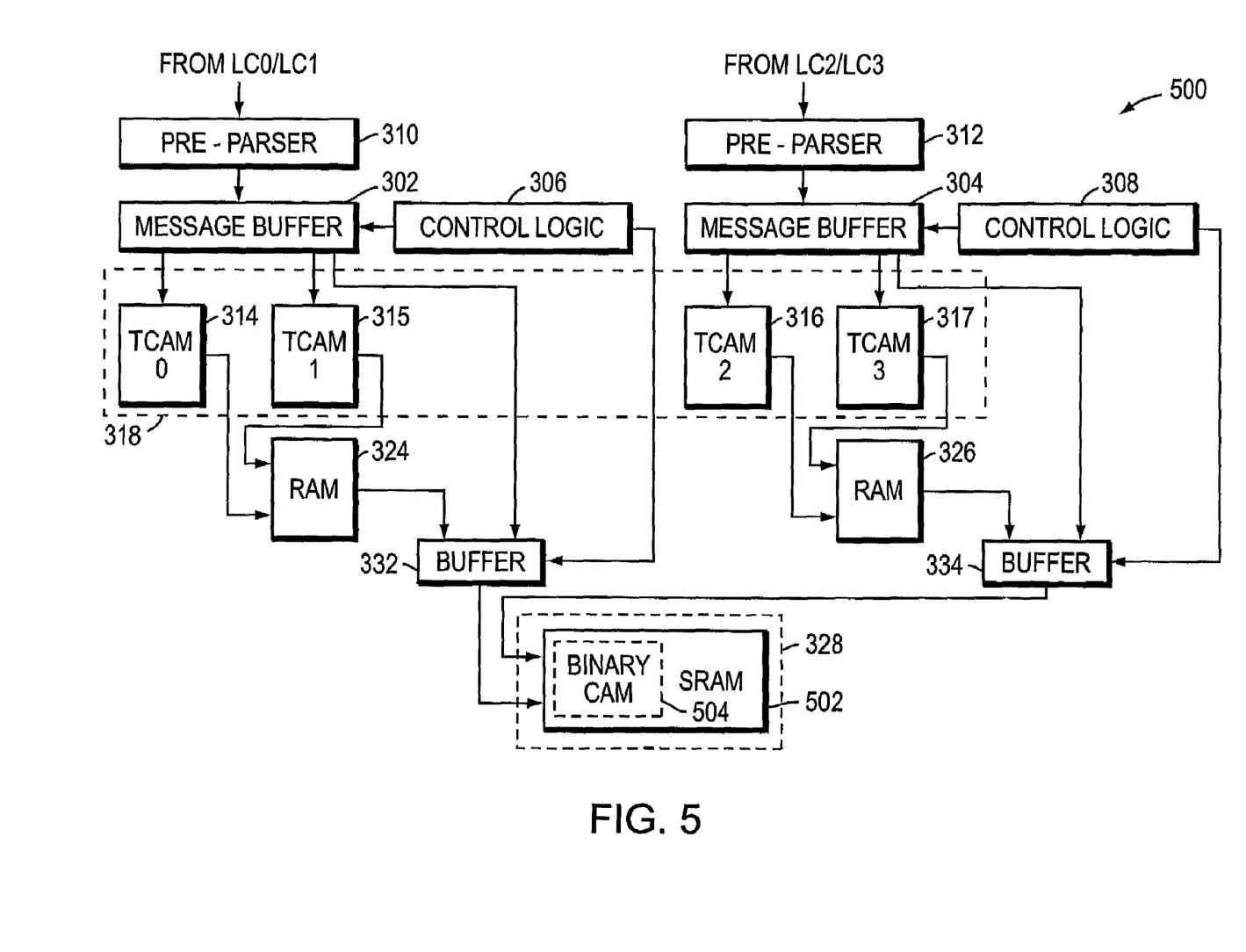
FIG. 5 is a highly schematic block diagram of an alternative embodiment of the hierarchical, associative memory structure.

FIG. 5 is a highly schematic block diagram of another embodiment of the classification engine 500 of the present invention. In this embodiment, the classification engine 500 has only a single stage 318 of parallel banks of TCAMs 314–317. Furthermore, the shared, single memory resource 328 includes an SRAM 502 that has been programmed to include a binary CAM 504. That is, the two TCAMs 320–321 of the classification engine 226 of FIG. 3 have been replaced with binary CAMs and these binary CAMs have been programmed into SRAM 502. The binary CAM 504 may be direct-mapped into the SRAM 502. That is, the hashed lookup value maps to a single entry. Alternatively, an SRAM 502 that is wide enough to access a whole hash bucket at a time may be provided. A hash bucket may contain one or multiple entries. If there are multiple entries, then each entry would need to be checked to see which one matches.

Those skilled in the art will recognize that other embodiments are also possible.

The foregoing description has been directed to specific embodiments of this invention. It will be apparent, however, that other variations and modifications may be made to the described embodiments, with the attainment of some or all of their advantages. For example, the techniques of the present invention may be applied to searching other long data strings such as URLs or other data records or files within an associative memory structure. It may also be used for searching IPv4 flow labels, especially where a reduction in the total number of CAMs and/or classification memory is desired. Therefore, it is an object of the appended claims to cover all such variations and modifications as come within the true spirit and scope of the invention.

What is claimed is:

1. In a network device having a plurality of ports for receiving and sending network messages having a plurality of fields, a classification engine configured to examine the network messages for predefined criteria and to generate corresponding actions to be applied to network messages containing the predefined criteria, the classification engine comprising:

a plurality of associative memories arranged into one or more stages, the associative memories configured with at least some of the predefined criteria; and a single, shared memory resource coupled to each of the plurality of associative memories of at least one stage, the shared memory resource configured with the actions to be applied to network messages, whereby two or more associative memories of the one or more stages are organized into a parallel bank that can process the same field of different network messages at substantially the same time and for each network message return one of the actions stored in the single, shared memory resource.

2. The classification engine of claim 1 wherein the associative memories operate at a first access time and the shared memory resource operates at a second access time that is some multiple of the first access time.

3. The classification engine of claim 2 wherein the multiple is one of 2, 4 or 8.

4. The classification engine of claim 1 wherein the associative memories of at least one stage are ternary content addressable memories (TCAMs).

5. The classification engine of claim 1 having at least two stages and further comprising one or more random access memories (RAMs) configured to receive outputs from the associative memories of a first stage, wherein
the network messages have Internet Protocol (IP) address fields, and
the associative memories of the first stage process at least the network message's IP addresses fields.

6. The classification engine of claim 5 wherein the associative memories of the first stage and the one or more RAMs cooperate to identify a uniform coordinate value sequence (UCVS) for the network message's IP address fields.

7. The classification engine of claim 1 wherein the network message comply with the Internet Protocol version 6 (IPv6) specification standard.

8. The classification engine of claim 1 wherein the network message comply with the Internet Protocol version 4 (IPv4) specification standard.

9. The classification engine of claim 1 wherein the single, shared memory resource includes a synchronous random access memory (SRAM).

10. The classification engine of claim 1 wherein
a first associative memory included in a given parallel bank is configured to process only network messages for a first set of network device ports, and
a second associative memory included in the given parallel bank is configured to process only network messages for a second set of network device ports.

11. The classification engine of claim 1 wherein
the network device includes a forwarding engine, and
the actions are provided to the forwarding engine.

12. A network device for processing a plurality of network messages in parallel, the network device comprising:
a plurality of associative memories organized into a parallel bank, each associative memory including a first plurality of entries;
a shared memory resource including a second plurality of entries configured to store a plurality of actions to be applied to the network messages, wherein each of the first plurality of entries is configured to specify one of the second plurality of entries; and
a control logic configured to apply a plurality of fields from the network messages to the associative memories at substantially the same time and to match one of the fields to one of the first plurality of entries, and, in response thereto, to return one the plurality of actions stored in the shared memory resource.

13. The network device of claim 12 wherein the associative memories comprise ternary content addressable memories (TCAMs).

14. The network device of claim 12 wherein the plurality of associative memories further comprises:
a first associative memory configured to process network messages associated with a first port of the network device; and
a second associative memory configured to process network messages associated with a second port of the network device.

15. The network device of claim 12 wherein the first plurality of entries is an identical plurality of entries for each associative memory.

16. The network device of claim 12 wherein the plurality of fields comprises one predetermined field from each network message.

17. The network device of claim 16 wherein the predetermined field is configured to specify an Internet Protocol (IP) address.

18. The network device of claim 16 wherein the predetermined field is configured to specify a unique coordinate value sequence (UCVS).

19. The network device of claim 12 wherein the network messages comply with the Internet Protocol version 6 (IPv6) specification standard.

20. The network device of claim 12 wherein the associative memories comprise a hash table.

21. The network device of claim 12 wherein the associative memories are configured to operate at a predetermined access time and the shared memory resource is configured to operate at a multiple of the predetermined access time.

22. The network device of claim 12 further comprising:
a pre-parser logic circuit configured to extract the plurality of fields from the network messages; and
a message buffer circuit coupled to the control logic and to the associative memories, the message buffer circuit configured to store the plurality of fields.

23. The network device of claim 12 further comprising an intermediate stage between the associative memories and the shared memory resource, the intermediate stage comprising:
a plurality of intermediate shared memory resources configured to return a plurality of intermediate results, each intermediate shared memory resource comprising a third plurality of entries, wherein each of the first plurality of entries is further configured to specify one of the third plurality of entries, and wherein each of the third plurality of entries is configured to specify one of the plurality of intermediate results; and
a plurality of intermediate associative memories organized into an intermediate parallel bank, each intermediate associative memory comprising a fourth plurality of entries, wherein each of the fourth plurality of entries is configured to specify one of the second plurality of entries, and wherein the control logic is further configured to apply the intermediate results to the intermediate associative memories at substantially the same time, wherein each intermediate result specifies one of the plurality of actions by matching one of the fourth plurality of entries.

24. A method for processing a plurality of network messages in parallel, the method comprising:
extracting a predetermined field from each network message to provide a plurality of fields;
searching for the plurality of fields in a parallel bank of associative memories at substantially the same time, the associative memories comprising a first plurality of entries;
specifying a second plurality of entries in a shared memory resource in response to each field of the plurality of fields matching one entry of the first plurality of entries; and
applying each of a plurality of actions to a corresponding one of the plurality of network messages, wherein each action is associated with one of the second plurality of entries by the shared memory resource.

25. The method of claim 24 wherein the associative memories comprise ternary content addressable memories (TCAMs).

26. The method of claim 24 further comprising:
programming each associative memory with an identical plurality of entries as the first plurality of entries.

27. The method of claim 24 wherein the predetermined field is configured to specify one or more of a group consisting of a unique coordinate value sequence (UCVS), a port of a network device, and a Virtual Local Area Network Identifier (VLAN ID).

28. The method of claim 24 wherein the network messages comply with an Internet Protocol version 6 (IPv6) specification standard.

29. The method of claim 24 wherein an access control list comprises a plurality of associations between a plurality of criteria and the plurality of actions, the method further comprising:
storing the criteria in the first plurality of entries; and
specifying one of the second plurality of entries in the shared memory resource in response to one of the plurality of fields matching the criteria.

30. The method of claim 24 wherein the step of applying each of the plurality of actions to the corresponding one of the plurality of network messages further comprises modifying the predetermined field of the corresponding one of the plurality of network messages.

31. The method of claim 30 wherein the predetermined field comprises a flow label.

32. The method of claim 31 wherein the step of modifying the predetermined field of the corresponding one of the plurality of network messages further comprises:
replacing an Internet Protocol version 6 (IPv6) address with a unique coordinate value sequence (UCVS).

33. The method of claim 24 wherein the step of specifying the second plurality of entries in the shared memory resource further comprises:
specifying a third plurality of entries in a plurality of intermediate shared memory resources in response to the plurality of fields matching the first plurality of entries;
returning a plurality of intermediate results from the intermediate shared memory resources, the intermediate results associated with the third plurality of entries;
searching for the plurality of intermediate results in a plurality of intermediate associative memories, the intermediate associative memories comprising a fourth plurality of entries; and
specifying the second plurality of entries in the shared memory resource in response to the plurality of intermediate results matching the fourth plurality of entries.

34. A network device for processing a plurality of network messages in parallel, the network device comprising:
means for extracting a predetermined field from each network message to provide a plurality of fields;
means for searching for the plurality of fields in a parallel bank of associative memories at substantially the same time, the associative memories comprising a first plurality of entries;
means for specifying a second plurality of entries in a shared memory resource in response to each field of the plurality of fields matching one entry of the first plurality of entries; and
means for applying each of a plurality of actions to a corresponding one of the plurality of network messages, wherein each action is associated with one of the second plurality of entries by the shared memory resource.

35. Computer readable instructions encoded in one or more computer readable media for execution by a processor, and when executed operable to:
extract a predetermined field from each network message to provide a plurality of fields;
search for the plurality of fields in a parallel bank of associative memories at substantially the same time, the associative memories comprising a first plurality of entries;
specify a second plurality of entries in a shared memory resource in response to each field of the plurality of fields matching one entry of the first plurality of entries; and
apply each of a plurality of actions to a corresponding one of the plurality of network messages, wherein each action is associated with one of the second plurality of entries by the shared memory resource.

36. An apparatus comprising:
a plurality of associative memories organized into a parallel bank, each associative memory including a first plurality of entries;
a shared memory resource including a second plurality of entries configured to store a plurality of unique coordinate value sequences (UCVSs), wherein each of the first plurality of entries is configured to specify one of the second plurality of entries; and
a control logic configured to apply a plurality of fields from a network message to the associative memories at substantially the same time and to match one of the fields to one of the first plurality of entries, and, in response thereto, to return one the UCVS stored in the shared memory resource;
at least one additional associative memory; and
wherein the control logic is further configured to apply the returned one the UCVS along with at least one additional field from the network message to the additional associative memory to cause the return of an action.

37. The apparatus of claim 36 wherein the plurality of associative memories organized into the parallel bank are ternary content addressable memories (TCAMs).

38. The apparatus of claim 36 wherein the plurality of associative memories organized into the parallel bank further comprises:
a first associative memory configured to process a first field of the network message; and
a second associative memory configured to process a second different field of the network message.

39. The apparatus of claim 36 wherein the plurality of associative memories organized into the parallel bank are configured to operate at a predetermined access time and the shared memory resource is configured to operate at a multiple of the predetermined access time.

40. The apparatus of claim 36 further comprising:
a pre-parser logic circuit configured to extract the plurality of fields from the network message; and
a message buffer circuit coupled to the control logic and to the plurality of associative memories organized into the parallel bank, the message buffer circuit configured to store the plurality of fields.

* * * * *